(12) United States Patent
He

(10) Patent No.: US 11,114,076 B1
(45) Date of Patent: Sep. 7, 2021

(54) SWITCH FINGERBOARD FOR VIOLIN FAMILY MUSICAL INSTRUMENTS

(71) Applicant: Yizong He, Forest Lake, MN (US)

(72) Inventor: Yizong He, Forest Lake, MN (US)

( * ) Notice: Subject to any disclaimer, the term of this patent is extended or adjusted under 35 U.S.C. 154(b) by 13 days.

(21) Appl. No.: 16/830,697

(22) Filed: Mar. 26, 2020

(51) Int. Cl.
*G10H 1/34* (2006.01)
*G09B 15/00* (2006.01)

(52) U.S. Cl.
CPC ........... *G10H 1/342* (2013.01); *G09B 15/003* (2013.01)

(58) Field of Classification Search
CPC ............ G10D 3/08; G10H 1/342; G10H 3/18; G10H 1/32; G10H 1/18; G10H 2220/015; G10H 2220/051; G10H 1/34; G10H 2220/221; G10H 1/344; G10G 1/02; G10G 1/04; G09B 15/02; G09B 15/00; G09B 15/006; G09B 15/009
See application file for complete search history.

(56) References Cited

U.S. PATENT DOCUMENTS

| | | | | |
|---|---|---|---|---|
| RE31,019 E | * | 8/1982 | Evangelista ........... | G10H 1/342 84/702 |
| 5,040,447 A | * | 8/1991 | Murata ................... | G10H 1/342 84/612 |
| 5,398,585 A | * | 3/1995 | Starr ....................... | G10H 1/342 84/646 |
| 5,415,071 A | * | 5/1995 | Davies ..................... | G10C 3/12 84/471 SR |
| 5,741,990 A | * | 4/1998 | Davies ................. | G09B 15/004 84/423 R |
| 5,900,571 A | * | 5/1999 | Partovi .................. | G10D 17/00 84/722 |
| 5,945,618 A | * | 8/1999 | Bennett ................ | G09B 15/026 84/477 R |
| 6,288,315 B1 | * | 9/2001 | Bennett ................ | G09B 15/004 84/470 R |
| 6,677,513 B1 | * | 1/2004 | Rutter ...................... | G10H 7/06 84/622 |
| 6,753,466 B1 | * | 6/2004 | Lee .......................... | G10D 3/00 84/470 R |
| 2005/0109196 A1 | * | 5/2005 | Whiteside .............. | G10H 1/342 84/722 |
| 2010/0083807 A1 | * | 4/2010 | Sullivan ................. | G10H 1/342 84/315 |
| 2010/0083808 A1 | * | 4/2010 | Sullivan ................. | G10H 1/342 84/315 |

(Continued)

*Primary Examiner* — Marlon T Fletcher
(74) *Attorney, Agent, or Firm* — Chen Yoshimura LLP

(57) ABSTRACT

A set of new accessories for the violin family instrument, switch fingerboards, which includes an assembly of switches, suitable for violin learners. Switches are laid out regularly on the spots corresponding to the notes which are written on the fingerboards. Once a switch is turned on (pressed by a finger), a CPU will be triggered, and then output of the signal of a desired pitch will immediately cause the speaker to produce a sound of that pitch. Such a switch fingerboard will surely assist beginners to practice how to stop strings and to shift positions to get pitches more precisely and efficiently. Additionally, an n-like, switch assembly fingerboard is described, where all the switches are embedded into a rectangular plate in equal intervals. With the same CPU, ROM, amplifier and speaker system, any sound recorded from a performance in the violin family, corresponding to each note, can be replayed on command.

4 Claims, 3 Drawing Sheets

(56) References Cited

U.S. PATENT DOCUMENTS

| | | | | |
|---|---|---|---|---|
| 2011/0011248 A1* | 1/2011 | Elion | ............... | G10H 1/0066 |
| | | | | 84/646 |
| 2012/0036982 A1* | 2/2012 | Sullivan | ............. | G10H 3/188 |
| | | | | 84/724 |
| 2012/0285314 A1* | 11/2012 | Kellner | ............... | G09B 15/06 |
| | | | | 84/485 R |
| 2013/0000462 A1* | 1/2013 | Freiberg | ........... | G09B 15/023 |
| | | | | 84/477 R |
| 2013/0174717 A1* | 7/2013 | Butera | ............... | G10H 1/342 |
| | | | | 84/609 |
| 2016/0163298 A1* | 6/2016 | Butera | ............. | G10H 1/0066 |
| | | | | 84/615 |

* cited by examiner

| n | Note | Hz | n | Note | Hz | n | Note | Hz | n | Note | Hz |
|---|---|---|---|---|---|---|---|---|---|---|---|
| -33 | 2C | 65.41 | -18 | 3D# | 155.5 | -3 | 4F# | 369.9 | 12 | 5A | 880.0 |
| -32 | 2C# | 69.30 | -17 | 3E | 164.8 | -2 | 4G | 392.0 | 13 | 5A# | 932.3 |
| -31 | 2D | 73.42 | -16 | 3F | 174.6 | -1 | 4G# | 415.3 | 14 | 5B | 987.7 |
| -30 | 2D# | 77.78 | -15 | 3F# | 185.0 | 0 | 4A | 440.0 | 15 | 6C | 1046.5 |
| -29 | 2E | 82.41 | -14 | 3G | 196.0 | 1 | 4A# | 466.1 | 16 | 6C# | 1108.7 |
| -28 | 2F | 87.31 | -13 | 3G# | 207.6 | 2 | 4B | 493.8 | 17 | 6D | 1174.6 |
| -27 | 2F# | 92.50 | -12 | 3A | 220.0 | 3 | 5C | 523.2 | 18 | 6D# | 1244.5 |
| -26 | 2G | 98.00 | -11 | 3A# | 233.1 | 4 | 5C# | 554.3 | 19 | 6E | 1318.5 |
| -25 | 2G# | 103.8 | -10 | 3B | 246.9 | 5 | 5D | 587.3 | 20 | 6F | 1396.9 |
| -24 | 2A | 110.0 | -9 | 4C | 261.6 | 6 | 5D# | 622.2 | 21 | 6F# | 1479.9 |
| -23 | 2A# | 116.5 | -8 | 4C# | 277.1 | 7 | 5E | 659.2 | 22 | 6G | 1567.9 |
| -22 | 2B | 123.4 | -7 | 4D | 293.6 | 8 | 5F | 698.4 | 23 | 6G# | 1661.2 |
| -21 | 3C | 130.8 | -6 | 4D# | 311.1 | 9 | 5F# | 739.9 | 24 | 6A | 1760.0 |
| -20 | 3C# | 138.5 | -5 | 4E | 329.6 | 10 | 5G | 783.9 | 25 | 6A# | 1864.6 |
| -19 | 3D | 146.8 | -4 | 4F | 349.2 | 11 | 5G# | 830.6 | 26 | 6B | 1975.5 |

Figure 5

SWITCH FINGERBOARD FOR VIOLIN FAMILY MUSICAL INSTRUMENTS

BACKGROUND OF THE INVENTION

Field of the Invention

This invention relates to an accessory of musical instruments.

Description of Related Art

The Table in FIG. 5 lists SSPN (Scientific Standard Pitch Notation), also known as American Standard Pitch Notation versus Frequency of Equal Temperament Tuning, which covers the primary notes produced by the violin family instruments (including the violin, viola and cello, excluding the double bass). All the notes in music acquire their names from the first seven letters of English alphabet A, B, C, D, E, F and G. The sharp signs [#] before a note, stands for raising a note by a semitone and the flat sign [b] is used to lower a note by a semitone. All the frequencies, shown in the Table, correspond to notes versus frequencies f obtained from the formula: $f=440 \times 2^{n/12}$ Hz, where integer n varies from −33 to 26. Mersenne's law indicates $$f = \frac{1}{2L_0}\sqrt{\frac{T}{\rho}},$$

where T is the tension of vibrating string, $\rho$ its linear density, and $L_o$ the length of the vibrating part of the string (between the nut and bridge for the violin family instrument). Although various sizes cause $L_o$ to be different, by adjusting T and $\rho$, all notes with various pitches listed can be obtained easily by the formula:

$$L_0 = \frac{1}{2f}\sqrt{\frac{T}{\rho}}.$$

Therefore relevant discussions here are suitable for the entire violin family with various sizes $L_o$. They are, for violin with size 1/32, 1/16, 1/10, 1/8, 1/4, 1/2, 3/4, 7/8, 4/4; for viola with size 12", 13", 14", 15", 15.5", 16", 16.5" and for cello with 1/16, 1/10, 1/8, 1/4, 1/2, 3/4, 7/8, 4/4-size.

Most violinists regard the violin as the most perfect musical instrument ever created. However, it is notoriously difficult to produce consistently beautiful sound. It takes many years to practice from playing spectacularly badly to even merely competently. One of the reasons that makes it so difficult is that the violinist has to press down and to shift positions on four strings on the right spots precisely, otherwise the note will be out of tune to some extent, even if the four open strings are all exactly in tune. In order to assist beginners to produce the notes more easily and precisely, there are currently two sorts of accessories. One is a specially designed colored, plastic tape. Each narrow-band adhesive is attached to the fingerboard, showing clearly the locations of four notes in each row. In other words, the thin strips of colored tape mark where students should place their fingers on the violin fingerboard. The second one, with a similar function is the violin fingering pattern chart, showing all the locations of notes, adhered to the fingerboard helping the beginner to get the correct pitch. The fingering pattern chart is so useful that almost every beginner inevitably becomes dependent on it. However, it is impossible for violinists to keep their eyes on the fingerboard all the time during their performance.

Most seasoned violinists will advise: don't rely solely on location for finger placement; use your ears and listen very carefully to each note. However, it is tricky, even impossible, for beginners to let the ears guide the hands.

Currently, there are two kinds of electronic organs, classic and modern. For the classic organ, the sound of the instrument is simulated by an oscillator. The oscillator generates signals of a certain frequency. Then the oscillating signal is reduced in half by a frequency divider because the frequency of a tone is exactly twice the frequency of the lower octave. So, if the frequency of one tone is divided by two, another tone that's an octave lower is produced. Keyboards are actually an assembly of switches. Pressing down a key on the keyboard is equivalent to turning on a switch, which causes the signal with the desired frequency to enter an amplifier of power, and then pushes the speaker to make a sound. A piece of music is made up of many different notes, and each corresponds to a different frequency. If oscillators are made according to the highest frequencies on the keyboard, processed by frequency dividers and amplified, many analog signals octaves lower can be obtained. This allows the organ to use a combination of different frequencies to play the desired music.

Unlike the classic organ, the modern electronic organ is not simulated by an oscillator. With the continuous development and improvement of chip manufacturing technology, using PCM (Pulse Code Modulation) to record the sound of a piano has become the mainstream sampling audio source technology. When a key is pressed on the keyboard of an electronic keyboard, the CPU (Central Processing Unit) will be triggered to read the digital signal of the corresponding frequency of the keyboard from ROM (Read Only Memory). After digital-analog conversion, the signal power will be amplified enough to push a speaker to emit sound.

SUMMARY

Based on this background, embodiments of the present invention provide a novel switch fingerboard for the violin family instrument for learners of the instrument. A broader fingerboard, n-like, whose notes cover almost the whole violin family, is also provided.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a switch fingerboard for a violin, viola or cello, which includes: four columns of switches, wherein the switches are pressure sensitive switches which are configured to remain off unless being pressed down, wherein a spatial arrangement of switches corresponds to positions of notes of American Standard Pitch Notation on a fingering pattern chart of the violin, viola or cello. The four columns of switches are arranged on the four columns in the following orders: for the violin: along a vertical projection of a 3G-string, corresponding to the positions of notes: 3G, 3G #, 3A, 3A #, 3B, 4C, 4C #, 4D, 4D #, 4E, 4F, 4F #, 4G, 4G #, 4A, 4A #, 4B, 5C, 5C #; along a vertical projection of a 4D-string, corresponding to the positions of notes: 4D, 4D #, 4E, 4F, 4F #, 4G, 4G #, 4A, 4A #, 4B, 5C, 5C #, 5D, 5D #, 5E, 5F, 5F #, 5G, 5G #; along a vertical projection of a 4A-string, corresponding to the positions of notes: 4A, 4A #, 4B, 5C, 5C #, 5D, 5D #, 5E, 5F, 5F #, 5G, 5G #, 5A, 5A #, 5B, 6C, 6C #, 6D, 6D #; and along a vertical projection of a 5E-string, corresponding to the positions of notes: 5E, 5F, 5F #, 5G, 5G #, 5A, 5A #, 5B, 6C, 6C #, 6D, 6D #, 6E, 6F, 6F #, 6G, 6G #, 6A, 6A #; or for the viola: along a vertical projection of a 3C-string, corresponding to the positions of notes: 3C, 3C #, 3D, 3D #, 3E, 3F, 3F #, 3G, 3G #, 3A, 3A #, 3B, 4C, 4C #, 4D, 4D #, 4E, 4F, 4F #; along a vertical projection of a 3G-string, corresponding to the positions of notes: 3G, 3G #, 3A, 3A #, 3B, 4C, 4C #, 4D, 4D #, 4E, 4F, 4F #, 4G, 4G #, 4A, 4A #, 4B, 5C, 5C #; along a vertical projection of a 4D-string, corresponding to the positions of notes: 4D, 4D #, 4E, 4F, 4F #, 4G, 4G #, 4A, 4A #, 4B, 5C, 5C #, 5D, 5D #, 5E, 5F, 5F #, 5G, 5G #; and along a vertical projection of a 4A-string, corresponding to the positions of notes: 4A, 4A #, 4B, 5C, 5C #, 5D, 5D #, 5E, 5F, 5F #, 5G, 5G #, 6A, 6A #, 5B, 6C, 6C #, 6D, 6D #, or for the cello: along a vertical projection of a 2C-string, corresponding to the positions of notes: 2C, 2C #, 2D, 2D #, 2E, 2F, 2F #, 2G, 2G #, 2A, 2A #, 2B, 3C, 3C #, 3D, 3D #, 3E, 3F, 3F #; along a vertical projection of a 2G-string, corresponding to the positions of notes: 2G, 2G #, 2A, 2A #, 2B, 3C, 3C #, 3D, 3D #, 3E, 3F, 3F #, 3G, 3G #, 3A, 3A #, 3B, 4C, 4C #; along a vertical projection of a 3D-string, corresponding to the positions of notes: 3D, 3D #, 3E, 3F, 3F #, 3G, 3G #, 3A, 3A #, 3B, 4C, 4C #, 4D, 4D #, 4E, 4F, 4F #, 4G, 4G #; and along a vertical projection of a 3A-string, corresponding to the positions of notes: 3A, 3A #, 3B, 4C, 4C #, 4D, 4D #, 4E, 4F, 4F #, 4G, 4G #, 4A, 4A #, 4B, 5C, 5C #, 5D, 5D #.

The lengths ($\Delta L$) of the switch positions, measured from a nut along the vertical projection of each of the four strings to a bridge on the fingerboard, are determined by a formula: $\Delta L = L_o(1-2^{-\Delta n/12})$, where $\Delta n$ is an integer ranging from integer 1 to 18, and where $L_o$ represents a length of the corresponding string between the nut and the bridge.

In another aspect, the present invention provides a system that includes the above switch fingerboard, and further includes a processor and a non-volatile memory coupled to each other, wherein the non-volatile memory stores digital data which encode sounds recorded from a violin, viola or cello corresponding to all notes listed in the American Standard Pitch Notation, wherein each switch is configured to generate a switch signal when being pressed down, wherein the processor is coupled to the switches and configured to receive and recognize the switch signals generated by the switches, wherein in response to receiving a switch signal, the processor is configured to access the non-volatile memory to retrieve stored digital data corresponding to the switch signal.

In another aspect, the present invention provides a switch fingerboard including two columns of switches, wherein the switches are pressure sensitive switches which are configured to remain off unless being pressed down, wherein spatial distances between any two adjacent switches in each column are equal, wherein the two columns of switches sequentially correspond to notes of American Standard Pitch Notation from a lowest note to a highest note in an n-like array, and wherein each switch is configured to generate a switch signal when being pressed down that identifies its position in the n-like array or a note in the American Standard Pitch Notation.

It is to be understood that both the foregoing general description and the following detailed description are exemplary and explanatory and are intended to provide further explanation of the invention as claimed.

BRIEF DESCRIPTION OF THE DRAWINGS

FIG. 5 shows a Table which lists the SSPN (Scientific Standard Pitch Notation) versus Frequency of Equal Temperament Tuning.

DETAILED DESCRIPTION OF PREFERRED EMBODIMENTS

Figure 1:
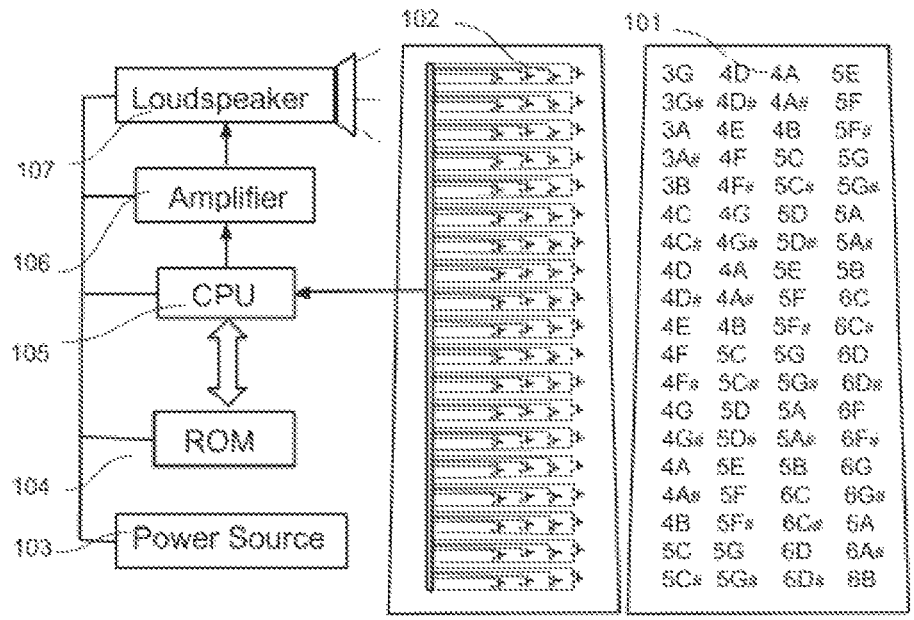
FIG. 1 illustrates a system including a switch violin fingerboard according to an embodiment of the present invention.
Figure 2:
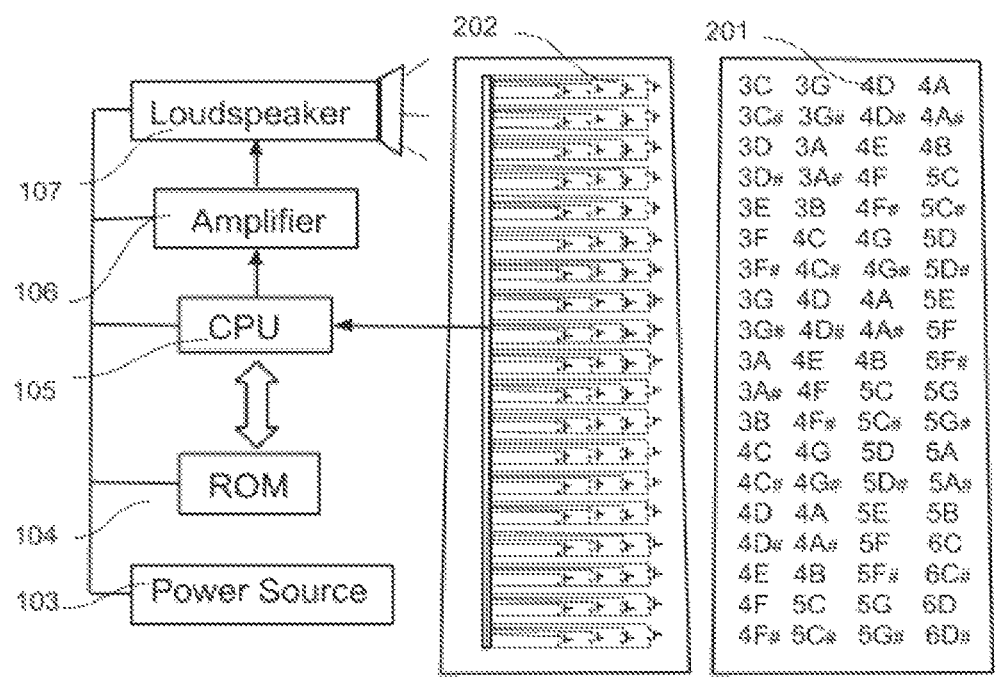
FIG. 2 illustrates a system including a switch viola fingerboard according to another embodiment of the present invention.
Figure 3:
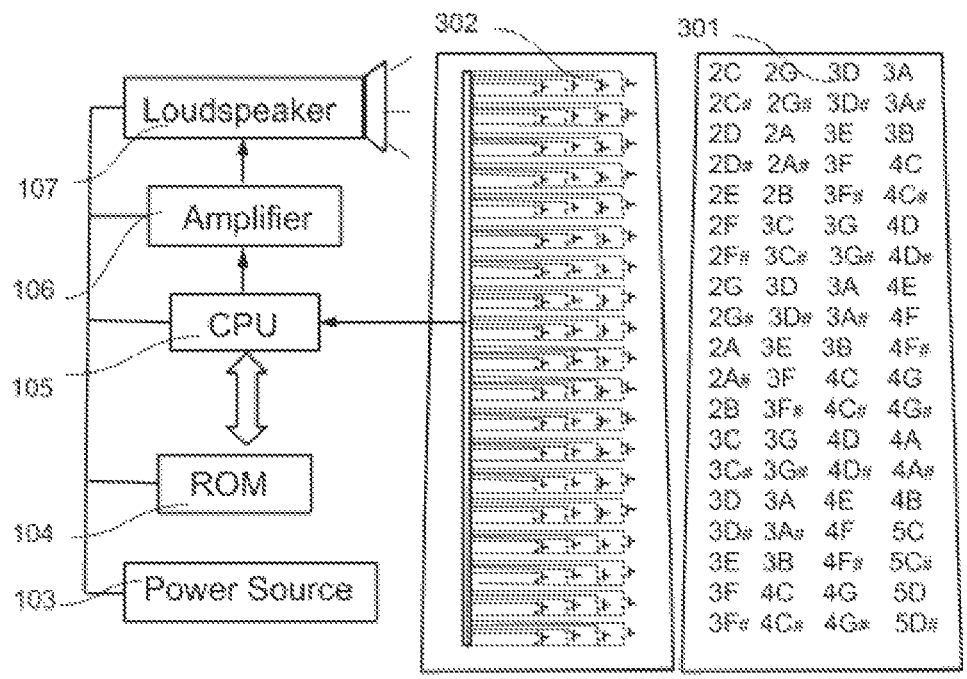
FIG. 3 illustrates a system including a switch cello fingerboard according to another embodiment of the present invention.

The primary SSPN of the violin is typically printed on the fingerboard along vertical projection of four strings 4G, 4D, 4A and 5E. In embodiments of this invention, a switch fingerboard 102 is provided, where each spot labelled by SSPN 101 on the violin fingering pattern chart is embedded with a switch, as shown in FIG. 1. Similarly, SSPN locations layout on the fingering pattern chart of viola and cello are shown as 201 and 301 in FIGS. 2 and 3, respectively. Also, the arrangement of their switches corresponds to each note as shown as 202 and 302 in FIG. 2, 3, respectively. The accurate digital coordinates of all the SSPN, also the spatial positions of switches, measured from the nut of the violin family instrument, can be accurately obtained from the formula: $\Delta L = L_o(1-2^{-\Delta n/12})$, where integer 4n ranges from 1 to 18, and $L_o$ represents the length between the nut and bridge of various sizes of the instrument, i.e. 1/32, 1/16, 1/10, 1/8, 1/4, 1/2, 3/4, 7/8, 4/4 sizes for violin; for viola and cello with sizes of 12", 13", 14", 15", 15.5", 16", 16.5" and 1/16, 1/10, 1/8, 1/4, 1/2, 3/4, 7/8, 4/4, respectively. In other words, in the switch fingerboard, the spatial arrangement of the switches correspond to the spatial arrangement of the positions of the notes along the strings of the actual violin family instruments.

Figure 4:
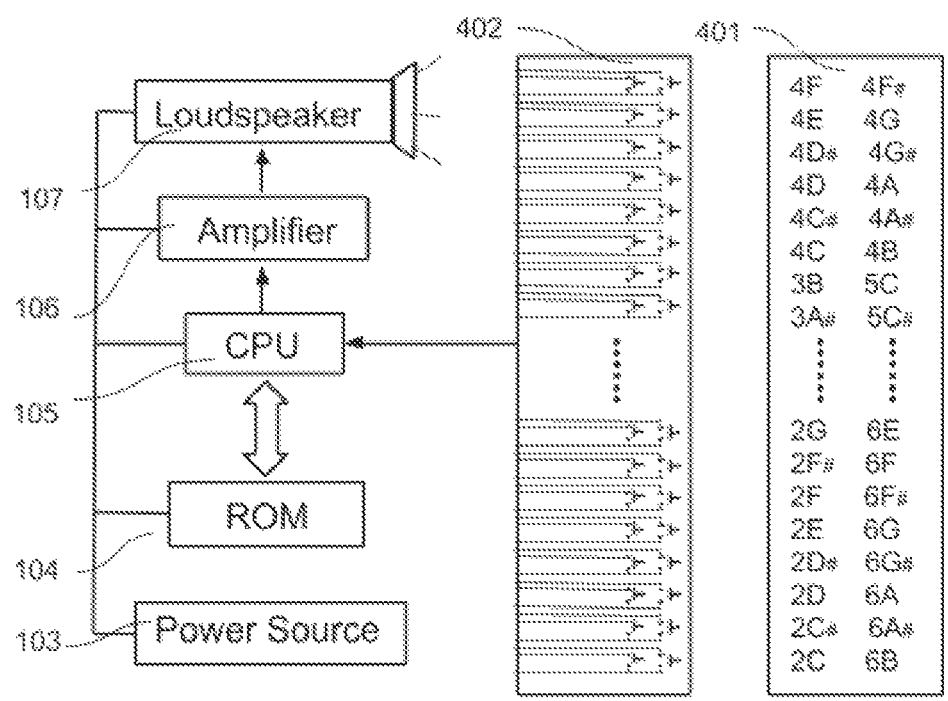
FIG. 4 illustrates a system including a n-like switch fingerboard according to another embodiment of the present invention.

FIG. 4 illustrates the structure of a broadened switch fingerboard 402 on which all spots corresponding to SSPN notes commonly used in the violin family are embedded with switches. The switches are consecutively arranged by an n-like array 401 in terms of their pitches from low to high. An n-like is an electronic musical instrument with press keys that can play pre-recorded sounds of violin family instruments. In the n-like pattern, the notes are arranged in two columns, and increase from the lowest note to the highest note in the order of: lower-left to upper-left to upper-right to lower-right positions (i.e. in the shape of the letter "n"). Different from the embodiments of FIGS. 1, 2, and 3, all the spatial intervals between adjacent two switches along the n-like path are equal. Therefore, the sounds corresponding to the notes frequently used in the violin family can be produced by the more dexterous right hand instead of the left.

The power source 103 shown in FIG. 1 serves as the supply of electricity for all parts of the whole switch fingerboard system.

FIGS. 1, 2, 3 and 4 also show identical block diagrams to illustrate the structure and basic principle of how to create, process a signal, and finally produce a desired sound at the moment a switch is turned on. Based on the mature technology of relevant electronics, once a switch, e.g. a pressure sensitive switch which remains off unless pressed down, is turned on to generate a signal, the CPU (or more generally, a processor) 105 receives and recognizes the switch signal (for example, the signal generated by each switch carries an identifier that identifies the switch and/or the corresponding note), and is triggered to access the ROM (Read Only Memory) (or more generally, a non-volatile memory) 104. The ROM stores digital data that encode all the sounds recorded from the violin family corresponding to all notes listed in the Table in FIG. 5. The CPU accesses the ROM based on the switch signals received from the switches to retrieve the corresponding digital data. The digital data is processed through a DAC (Digital-to-Analogue Conversion) (not shown), and amplifier 106, and finally drives the speaker 107 to accurately produce a sound.

It is obvious that practicing performance on such a switch assembly fingerboard system can make learners familiar with producing the sounds for all the notes correctly and efficiently. Also, it will be convenient to train the fingers to shift positions more precisely and skillfully. Because the recorded sounds saved in ROM are performed by seasoned violinists with precise pitch, the ears of learners can be trained perfectly. An n-like fingerboard can be played serving as a new independent musical instrument.

In embodiments of the present invention, the switch fingerboards include fingerboards of the violin family and are made of switches. All the switches remain off unless they are pressed down. The sizes and shapes of the switch fingerboard are identical to the fingerboard of a respective instrument of the violin family. More narrowly, four column switches are embedded at the positions of notes (scientific standard pitch notation, or American standard pitch notation) on the fingerboard. The switches do not protrude appreciably from the fingerboard surface, nor do they recede appreciably from the fingerboard surface when being pressed—in other words, they are not similar to keys of a keyboard. Alternatively, the physical form of the switch fingerboard 102 may be a flexible sheet, where the pressure sensitive switches, preferably having a thin and flat shape, are embedded in the flexible sheet in the above-described spatial arrangement. The flexible sheet may then be adhered to a fingerboard of a corresponding musical instrument or a rigid member having the shape of a fingerboard of a corresponding musical instrument. The signals generated by the switches may be transmitted to the CPU 105 by wires. The CPU 105 and ROM 104 may be formed in one physical unit (a controller) which is connected to the power source 103, amplifier 106, and speaker 107.

It will be apparent to those skilled in the art that various modification and variations can be made in the switch fingerboard of the present invention without departing from the spirit or scope of the invention. Thus, it is intended that the present invention cover modifications and variations that come within the scope of the appended claims and their equivalents.

What is claimed is:

1. A switch fingerboard for a violin, viola or cello, comprising:
   four columns of switches, wherein the switches are pressure sensitive switches which are configured to remain off unless being pressed down, wherein a spatial arrangement of switches corresponds to positions of notes of American Standard Pitch Notation on a fingering pattern chart of the violin, viola or cello, wherein the four columns of switches are arranged on the four columns in the following orders:
   for the violin:
      along a vertical projection of a 3G-string, corresponding to the positions of notes: 3G, 3G #, 3A, 3A #, 3B, 4C, 4C #, 4D, 4D #, 4E, 4F, 4F #, 4G, 4G #, 4A, 4A #, 4B, 5C, 5C #,
      along a vertical projection of a 4D-string, corresponding to the positions of notes: 4D, 4D #, 4E, 4F, 4F #, 4G, 4G #, 4A, 4A #, 4B, 5C, 5C #, 5D, 5D #, 5E, 5F, 5F #, 5G, 5G #,
      along a vertical projection of a 4A-string, corresponding to the positions of notes: 4A, 4A #, 4B, 5C, 5C #, 5D, 5D #, 5E, 5F, 5F #, 5G, 5G #, 5A, 5A #, 5B, 6C, 6C #, 6D, 6D #, and
      along a vertical projection of a 5E-string, corresponding to the positions of notes: 5E, 5F, 5F #, 5G, 5G #, 5A, 5A #, 5B, 6C, 6C #, 6D, 6D #, 6E, 6F, 6F #, 6G, 6G #, 6A, 6A #, or
   for the viola:
      along a vertical projection of a 3C-string, corresponding to the positions of notes: 3C, 3C #, 3D, 3D #, 3E, 3F, 3F #, 3G, 3G #, 3A, 3A #, 3B, 4C, 4C #, 4D, 4D #, 4E, 4F, 4F #,
      along a vertical projection of a 3G-string, corresponding to the positions of notes: 3G, 3G #, 3A, 3A #, 3B, 4C, 4C #, 4D, 4D #, 4E, 4F, 4F #, 4G, 4G #, 4A, 4A #, 4B, 5C, 5C #,
      along a vertical projection of a 4D-string, corresponding to the positions of notes: 4D, 4D #, 4E, 4F, 4F #, 4G, 4G #, 4A, 4A #, 4B, 5C, 5C #, 5D, 5D #, 5E, 5F, 5F #, 5G, 5G #, and
      along a vertical projection of a 4A-string, corresponding to the positions of notes: 4A, 4A #, 4B, 5C, 5C #, 5D, 5D #, 5E, 5F, 5F #, 5G, 5G #, 6A, 6A #, 5B, 6C, 6C #, 6D, 6D #, or
   for the cello:
      along a vertical projection of a 2C-string, corresponding to the positions of notes: 2C, 2C #, 2D, 2D #, 2E, 2F, 2F #, 2G, 2G #, 2A, 2A #, 2B, 3C, 3C #, 3D, 3D #, 3E, 3F, 3F #,
      along a vertical projection of a 2G-string, corresponding to the positions of notes: 2G, 2G #, 2A, 2A #, 2B, 3C, 3C #, 3D, 3D #, 3E, 3F, 3F #, 3G, 3G #, 3A, 3A #, 3B, 4C, 4C #,
      along a vertical projection of a 3D-string, corresponding to the positions of notes: 3D, 3D #, 3E, 3F, 3F #, 3G, 3G #, 3A, 3A #, 3B, 4C, 4C #, 4D, 4D #, 4E, 4F, 4F #, 4G, 4G #, and
      along a vertical projection of a 3A-string, corresponding to the positions of notes: 3A, 3A #, 3B, 4C, 4C #, 4D, 4D #, 4E, 4F, 4F #, 4G, 4G #, 4A, 4A #, 4B, 5C, 5C #, 5D, 5D #;
   wherein lengths ($\Delta L$) of the switch positions, measured from a nut along the vertical projection of each of the four strings to a bridge on the fingerboard, are determined by a formula: $\Delta L = L_o(1-2^{-\Delta n/12})$, where $\Delta n$ is an integer ranging from integer 1 to 18, and where $L_o$ represents a length of the corresponding string between the nut and the bridge.

2. The switch fingerboard of claim 1, wherein the violin is a 1/32, 1/16, 1/10, 1/8, 1/4, 1/2, 3/4, 7/8, 4/4-size violin, or the viola is a 12", 13", 14", 15", 15.5", 16", 16.5"-size viola, or the cello is a 1/16, 1/10, 1/8, 1/4, 1/2, 3/4, 7/8, 4/4-size cello.

3. A system including the switch fingerboard of claim 1, the system further comprising a processor and a non-volatile memory coupled to each other, wherein the non-volatile memory stores digital data which encode sounds recorded from a violin, viola or cello corresponding to all notes listed in the American Standard Pitch Notation, wherein each switch is configured to generate a switch signal when being pressed down, wherein the processor is coupled to the switches and configured to receive and recognize the switch signals generated by the switches, wherein in response to receiving a switch signal, the processor is configured to access the non-volatile memory to retrieve stored digital data corresponding to the switch signal.

4. The system of claim 3, further comprising:
a signal processing circuit including an amplifier, the signal processing circuit being coupled to the processor and configured to process the digital data; and
a speaker coupled to the signal processing circuit and configured to generate a sound based on the processed data.

\* \* \* \* \*